United States Patent Office 2,931,465
Patented Apr. 5, 1960

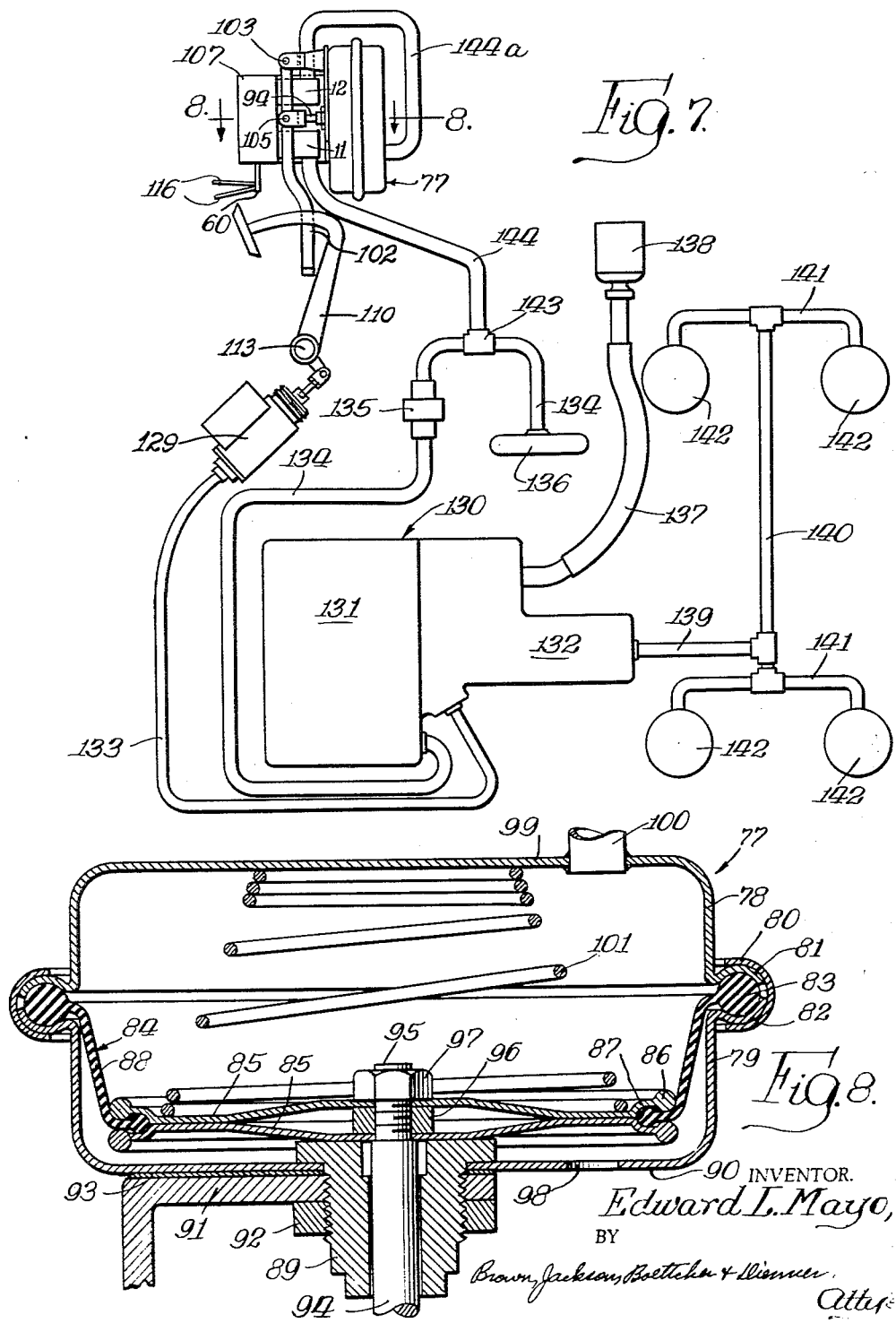

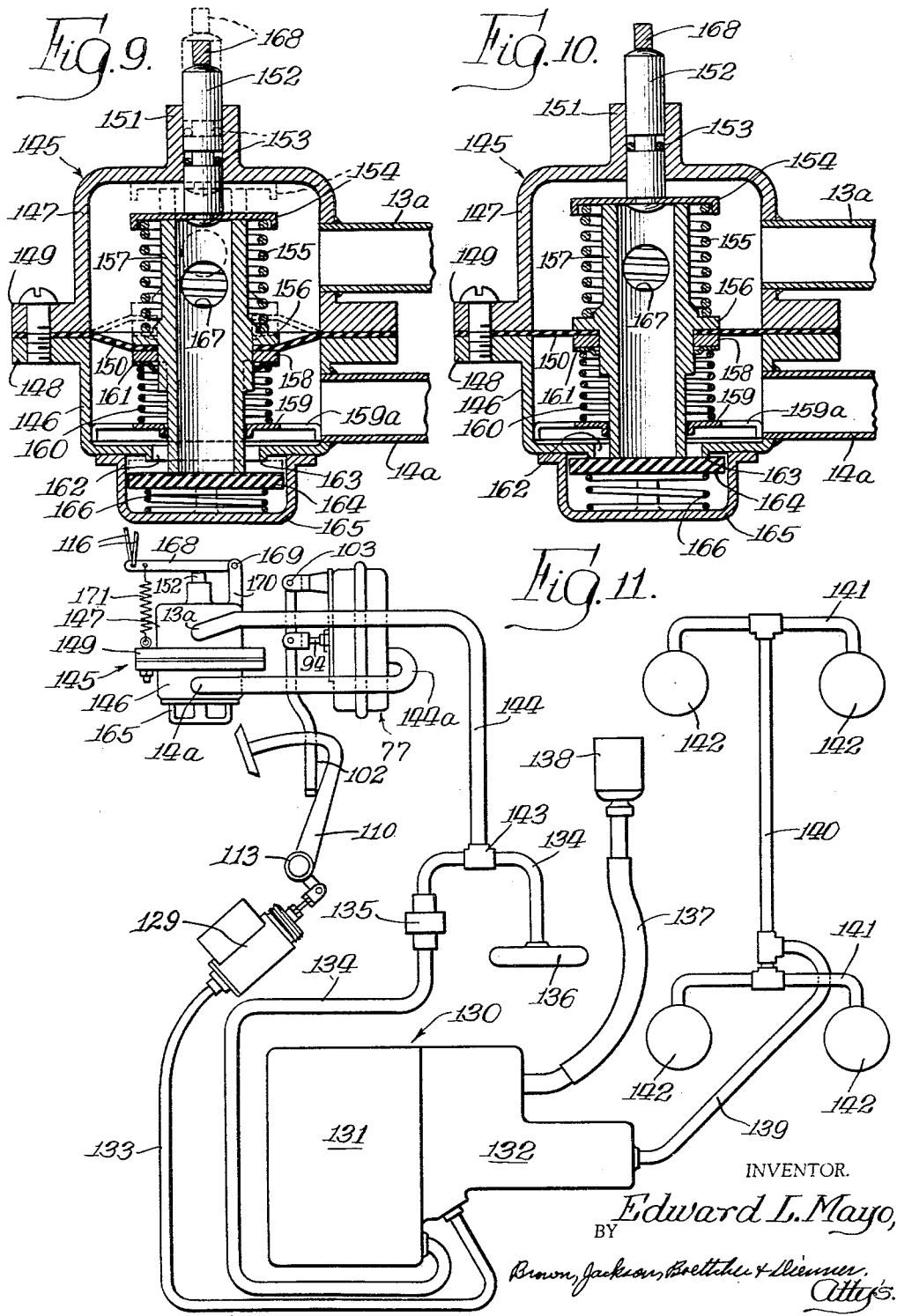

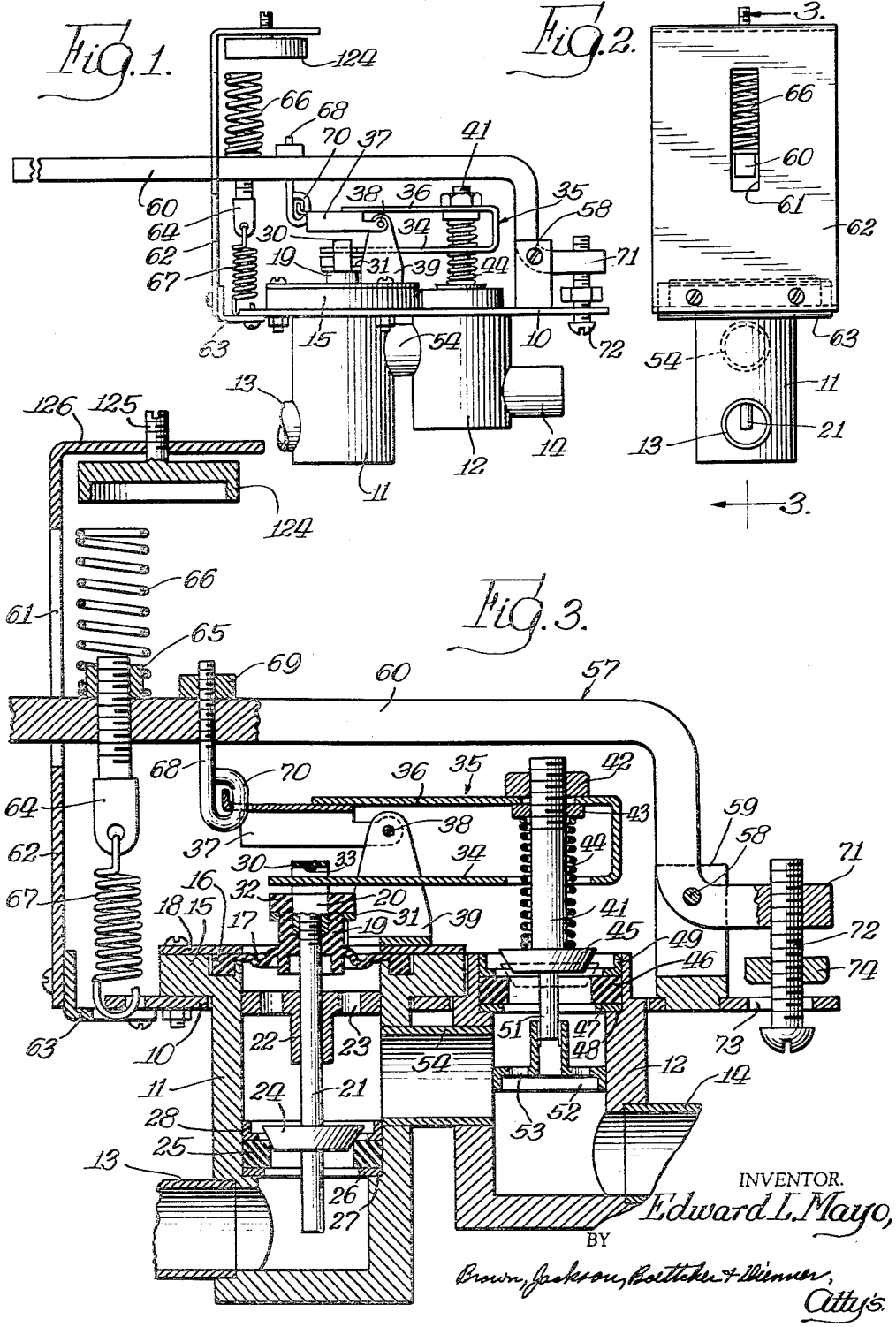

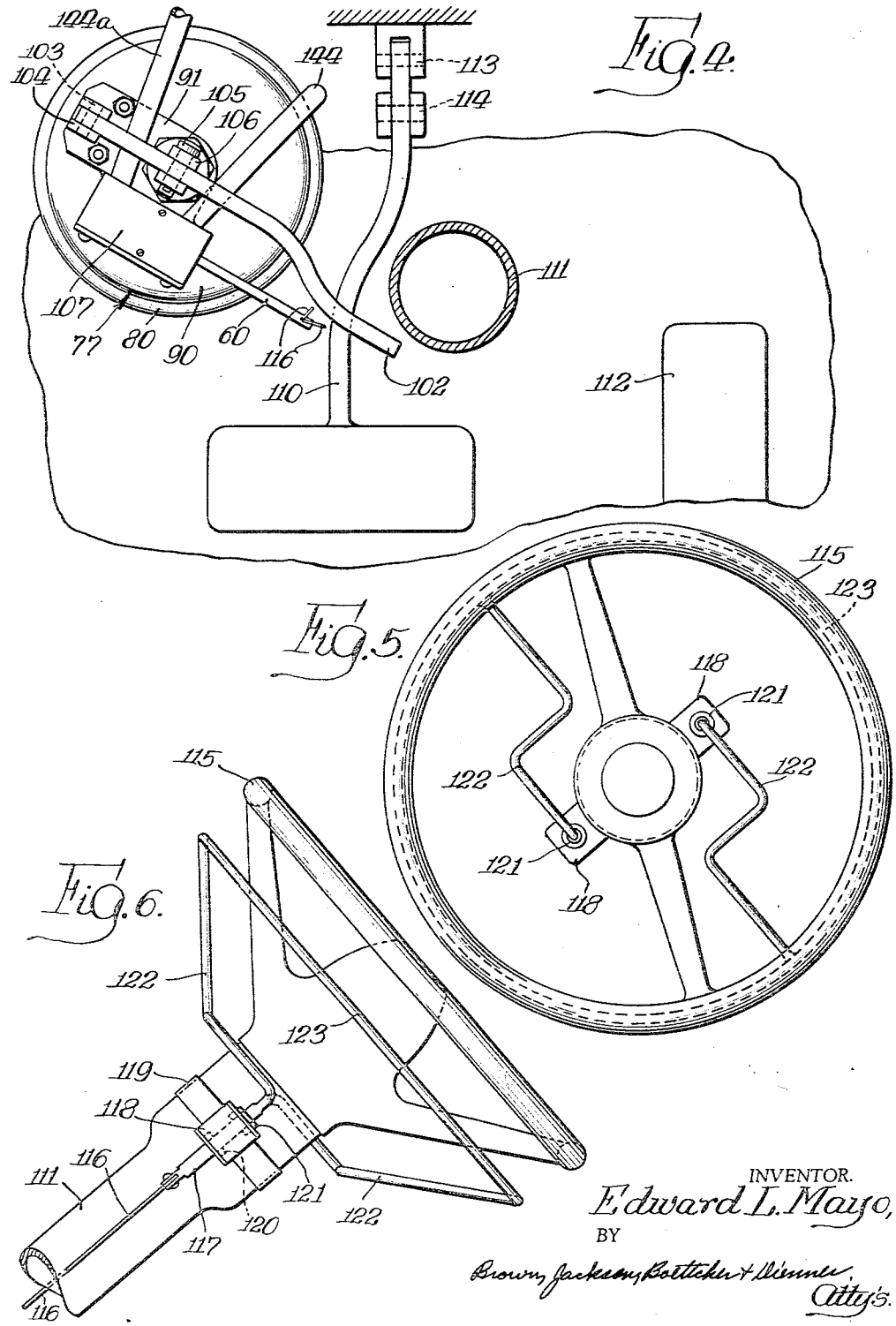

2,931,465

AUTOMOBILE POWER BRAKE MEANS

Edward L. Mayo, Cleveland, Ohio

Application February 5, 1957, Serial No. 638,243

8 Claims. (Cl. 188—106)

This invention realtes to braking systems for automotive vehicles, and has to do with brake means particularly suitable for use with passenger automobiles.

Power brakes for passenger automobiles are well known and rather extensively used. In all of such power brakes with which I am familiar braking is accomplished by pressure exerted upon the conventional brake pedal. The driver, in order to apply the brakes, must remove his right foot from the accelerator pedal and place it upon the brake pedal before he can initiate braking by the power brake means, which is objectionable. On the average, an interval of approximately two seconds elapses between the time the driver recognizes the necessity for braking and the time when he starts to exert effective braking pressure on the brake pedal. Approximately one-half of that time is required for the driver to transfer his foot from the accelerator pedal to the brake pedal. If the automobile is travelling at moderately high speed, 60 miles per hour for example, there may not be sufficient time available in which to stop the automobile and a collision, possibly resulting in a serious accident, may occur. Further, if the automobile is travelling on an icy or slippery surface when the brakes are applied the automobile may go into a skid and, with the driver's foot upon the brake pedal, there is no engine power available for maneuvering the automobile out of the skid.

My invention is directed to brake means which avoids the above noted objections to the present power brake systems. To that end I provide means whereby the present type of power brake means is supplemented by power means effective for exerting pressure upon the brake pedal thereby rendering available, in case of emergency, additional substantial braking pressure. I further provide means whereby braking may be actuated by hand operated means so disposed as to be readily grasped by the hand while grasping also the steering wheel, such that the braking effect may be readily controlled. The supplemental means is connected to the conventional brake pedal in such manner that the latter may be used for braking if desired independently of the hand control, or both may be used simultaneously, the brake pedal then providing additional braking pressure for abruptly stopping the automobile in case of emergency. Except in cases of stoppage of the engine and resultant loss of vacuum, the hand control means may be relied upon for effecting braking, leaving the driver's right foot free for operating the accelerator pedal, rendering available engine power for maneuvering the automobile out of a skid when braking on an ice coated or other slippery surface. Further objects and advantages of my invention will appear from the detail description.

In the drawings:

Figure 1 is a side view of the valve control means of the brake means of my invention;

Figure 2 is a front view of the control valve means of Figure 1;

Figure 3 is a sectional view, on an enlarged scale, taken substantially on line 3—3 of Figure 2, certain parts being shown in elevation and certain other parts being broken away and shown in sections;

Figure 4 is a plan view of the primary motor and the control valve means and associated parts including the brake pedal and the steering column, the latter being shown in section and the accelerator pedal being shown fragmentarily in plan view;

Figure 5 is a top plan view of the steering column and the steering wheel thereon showing the hand operated means on the steering column for operating the control valve means;

Figure 6 is a side view of the upper portion of the steering column and the steering wheel and associated parts;

Figure 7 is a diagrammatic view of the brake means of my invention;

Figure 8 is a sectional view, on an enlarged scale, of the primary motor taken substantially on line 8—8 of Figure 7, the control valve means being omitted and certain parts being broken away for clearness of illustration.

Figure 9 is an axial sectional view of a modified form of control valve means of my invention showing the vacuum control valve in brake releasing position in full lines and in full braking position in broken lines;

Figure 10 is a view similar to Figure 9 but showing the vacuum control valve in brake holding position; and Figure 11 is a diagrammatic view similar to Figure 7 but including the modified form of control valve means of Figures 9 and 10.

The control valve means comprises a mounting plate 10 having openings receiving two cylinders 11 and 12 into the lower ends of which open nipples 13 and 14, respectively. The nipple 13 is connected to a suitable source of suction and the nipple 14 is connected to a pneumatic suction or vacuum motor, as will be explained more fully later, cylinder 11 being a suction cylinder and cylinder 12 being an air admission cylinder. Cylinder 11 is provided at its upper end with an outer circumferential flange 15 recessed from its upper face for reception of a circumferential bead 16 of an elastic diaphragm 17, formed of rubber or other suitable material. Bead 16 is clamped between the bottom of the recess or channel in flange 15 and an annular clamp plate 18 secured to flange 15, conveniently by bolting, the bolts for securing plate 18 conveniently passing through the mounting plate 10 and serving also to secure it to flange 15.

The diaphragm 17 is provided with a central upwardly extending neck 19 in which is anchored, by a cap nut 20, the upper end of a valve stem 21 slidably mounted through a guide 22 secured in the upper portion of cylinder 11 and provided with a plurality of openings 23. A suction control valve 24 is secured on stem 21 a short distance above the lower end thereof and normally seats upon an annular valve seat member 25 formed of rubber or other suitable elastic material and confined between a lower ring 26 seating upon an interior shoulder 27 of cylinder 11 and an upper ring 28 of angle cross section suitably secured in cylinder 11, conveniently by having a push fit therein. As will be seen from Figure 3, the valve 24 is disposed above nipple 13 and controls communication between the lower portion of cylinder 11 and the upper portion thereof.

A stirrup 30 extends above and bridges neck 19, to which it is anchored by a ring 31 integral with stirrup 30 and fitting about neck 19 at the underface of a circumferential flange 32 at the upper end of neck 19. Stirrup 31 is provided at the center of the bight portion thereof with a downwardly extending rounded boss 33 and receives the forward end portion of the lower arm 34 of a leaf spring 35 of substantially elongated U-shape. The forward end portion of the upper arm 36 of leaf spring 35 is secured to a yoke 37 pivoted at its rearward end, at 38, on a U bracket 39 secured to and extending upward from clamp plate or ring 18. Normally valve 24 is in its closed position shown in Figure 3 with the lower arm 34 of leaf spring 35 spaced a short distance below boss 33, as shown.

The forward portion of arm 34 of leaf spring 35 is reduced in width to pass through the stirrup 30 and upper arm 36 of leaf spring 35 is provided, adjacent its rearward end, with an opening which receives the threaded upper portion of a valve stem 41 attached thereto by nut 42 threaded on stem 41 and seating on the upper face of arm 36, there being a ring 43 disposed about stem 41 at the underface of arm 36. A compression spring 44, disposed about valve stem 41, is confined between ring 43 and an air admission valve 45 secured to the lower end of stem 41. Valve 45 cooperates with an annular seat member 46 preferably formed of rubber or other suitable elastic material and confined between a lower ring 47 seating on an interior shoulder 48 of cylinder 12 and an upper ring 49 of angle cross section secured in the upper end of cylinder 12, conveniently by having a push fit therein. The air admission valve 45 is provided with a downwardly extending stud 51 slidable through a guide member 52 secured in cylinder 12, conveniently by having a push fit therein, above nipple 14. The guide member 52 is provided with a plurality of openings 53 and is disposed at about the mid-height of a short tube 54 cross connecting the cylinders 11 and 12 and establishing free communication therebetween above the suction valve 24 and below the air admission valve 45.

A control valve operating lever 57 of approximately Z-shape is pivoted adjacent its rearward end, at 58, in a U bracket 59 secured to the mounting plate 10. The upper arm 60 of lever 57 overlies the leaf spring 35 and associate parts and extends through a vertical slot 61 in an angle guide plate 62 secured at its lower end, by an angle bracket 63, to the forward end of mounting plate 10. An eye bolt 64 is secured through arm 60 adjacent plate 62 by means of a nut 65 threaded on its upper end and receiving the lower end portion of a compression spring 66. A tension spring 67 is anchored at its upper end to eye bolt 64 and at its lower end to mounting plate 10. Spring 67 urges lever 60 in counterclockwise direction about its pivot 58 and normally holds it in brake releasing position, with suction valve 24 in closed position and the air admission valve 45 in open position, as shown in Figure 3. A second eye bolt 68 is secured through arm 60 of lever 57 by a nut 69 threaded on its upper end. The forward end of the bight portion of yoke 37 is provided with an opening which receives the inner or rearward portion of eye 70 of bolt 68, it being noted that eye 70, in the normal position of lever 60 extends downward beyond the bight portion of the yoke 37 providing a lost motion connection between the two. The lower arm 71 of lever 57 is of relatively short length and receives a bolt 72 threaded therethrough and extending downward through an opening 73 in mounting plate 10 of adequate size to accommodate movement of bolt 72 with the lever 60. A nut 74 threaded on bolt 72 between arm 71 and mounting plate 10 provides an adjustable stop in cooperation with plate 10 for limiting clockwise movement of lever 60 about its pivot 58. During the first part of the movement of lever 57 in clockwise direction, which is its brake applying direction, the air admission valve is closed, as indicated in broken lines in Figure 3, and thereafter yoke 37 is swung in clockwise direction by the eye bolt 68 until the lower arm 34 of leaf spring 35 contacts boss 33 of stirrup 30, after which, in the continued upward movement of arm 60 of lever 57, the suction valve 24 is moved to open position thus establishing communication between nipples 13 and 14, for a purpose to be explained presently.

The control valve means of Figures 1 to 3, inclusive, is used in connection with a suction operated pneumatic motor 77 shown more clearly in Figure 8. The motor 77 includes a housing formed in two sections 78 and 79 secured together by a clamp ring 80 engaging over arcuate circumferential flanges 81 and 82 of sections 78 and 79, respectively, the flanges 81 and 82 clamping between them a peripheral bead 83 of circular cross section integral with a diaphragm 84 comprising a rim portion formed of rubber or other suitable material and two discs 85 together providing the head of the diaphragm. The discs 85 are provided with peripheral beads 86 of circular cross section and with offset peripheral portions defining between them a channel in which is clamped a bead 87 extending about the radially inner edge of the rim portion 88 of the diaphragm. A tubular fitting 89 is inserted through end wall 90 of casing section 79 and is provided at its inner end with an outer circumferential flange seating on the inner face of wall 90. An angle bracket 91 extends about fitting 89 and is clamped to wall 90 by a nut 92 threaded on fitting 89, there being a gasket 93 interposed between bracket 91 and wall 90. A plunger 94 is slidably mounted through fitting 89 and is provided at its inner end with a reduced screw stud 95 upon which is threaded an outer nut 96 clamping the center of the outer disc 85 to plunger 94, and an inner nut 97 clamping the center of the inner disc 85 between the nuts 96 and 97. Wall 90 of section 79 of casing 77 is provided with an opening 98 through which that end of casing 77 has permanent communication with the atmosphere and end wall 99 of section 78 of casing 77 has secured therethrough a nipple 100 by means of which the interior of casing 77, between the diaphragm and wall 99, may be connected to a source of suction, as will be explained presently. A spiral compression spring 101 is confined between discs 85 of diaphragm 84 and wall 99 of the motor casing and yieldingly urges the discs 85 and with them the plunger 94 outward of the casing. The bracket 91 may be further secured to end wall 90 of the motor casing by bolting, as shown in Figure 4.

A brake operating lever 102 is pivoted at one end, at 103, between a pair of ears 104 extending upward from bracket 91. Lever 102 overlies plunger 94 and is pivotally mounted by a pin 105 in a U head 106 secured to the outer or upper end of plunger 94. Preferably the control valve means of Figures 1 to 3, inclusive, may be enclosed in a suitable housing 107 mounted on bracket 91 with the upper arm 60 of the valve operating lever extending through one end of such housing adjacent and generally parallel with the brake operating lever 102, as shown in Figure 4.

The suction operated or vacuum motor 77 of Figure 8, which is the primary motor of the braking means of my invention, within the broader aspects of my invention, may be of any suitable type. It is mounted adjacent the brake pedal 110 of the automobile, conveniently on the fire wall, with lever 102 overlying pedal 110. The brake pedal 110 is disposed adjacent the steering column 111, at the left thereof and the accelerator pedal 112 is spaced a short distance from the steering column 111 at the right thereof, in accordance with the usual practice. The brake pedal 110 is pivoted at 113, is normally held raised by suitable yielding means (not shown) and has operating connection at 114 to a power brake system to be considered more fully presently. A steering wheel 115 is mounted at the upper end of column 111, as usual. Two flexible cables 116 are attached at their lower ends to the inner end of the valve operating lever arm 60 and are secured at their upper ends to two plungers 117 slidably mounted in guide frames 118 disposed at opposite sides of the steering column 111 and mounted thereon by means of a strap 119 secured about column 111. Preferably the guide frames 118 are provided with antifriction means 120 to facilitate movement of plungers 117 lengthwise of column 111, downward movement of the respective plungers being limited by a collar 121 secured thereon above guide frame 118. Each of the plungers 117 is connected by a substantially Z-shaped arm 122 to an annular operating member 123 underlying the rim of steering wheel 115 in proximity thereto and substantially concentric therewith. The operating member 123 is so disposed relative to the steering wheel 115 that it may readily be grasped by the fingers while also grasping the steering wheel, so as to be moved upward for causing upward movement of arm 60 of the valve operating lever, but little effort being required to accomplish that result. The compression spring 66 previously referred to and shown in Figures 1 to 3, inclusive, underlies a cup 124 having a threaded stem 125 adjustable through an arm 126 projecting rearward from the upper end of guide plate 62. In the upward movement of arm 60 the spring 66 contacts cup 124 and offers yielding resistance to upward movement of lever 57 for the purpose of guarding against too rapid application of full braking power under normal conditions. The compression spring 66, while preferred, is not essential to my invention and may be omitted if desired.

The suction operated primary motor 77 provides a source of power for applying pressure to the brake pedal 110 which has operating connection to a master cylinder 129, as shown in Figure 7, of a conventional power brake system comprising a power or booster unit 130 which includes a suction operated motor 131 and an associated cylinder 132. The master cylinder 129 is connected by a conduit 133 to the power unit 130 in a known manner and motor 131 of unit 130 is connected by a conduit 134, in which is interposed a check valve 135, to a suitable source of suction such as the intake manifold 136 of the automobile engine. An air inlet conduit 137, provided with an air filter 138, is connected to power unit 130 in a known manner. Cylinder 132 of unit 130 is connected by a conduit 139 and conduits 140 and 141, provided with appropriate fittings, to the automobile wheel brake cylinders 142. A T 143 is interposed in conduit 134, for a purpose to be described presently. The booster unit 130 is of known construction and operation, being essentially the same in operation as that of the Ringer Patent No. 2,598,604, and is made and sold by Midland Steel Products Corporation of Owosso, Michigan. The brake system shown diagrammatically in Figure 7, exclusive of the primary motor and control valve means of my invention and the T 143, is representative of known conventional power brake systems of which there are several in use. In that system pressure exerted on the brake pedal 110 is transmitted from master cylinder 129 through conduit 133 to the booster unit 130 and thence by way of cylinder 132 and conduits 139, 140 and 141 to the wheel brake cylinders 142 for applying the brakes under pressure to the wheels. Further, the pressure transmitted to unit 130 connects motor 131 thereof to the suction source 136 and motor 131 then applies pressure to cylinder 132 which is transmitted to the wheel brake cylinders 142 and supplements the pressure transmitted from the brake pedal 110. In the event of failure of the motor 131 of unit 130 the brake pedal 110 remains effective for braking purposes, as a safety feature, the effective pressure exerted by the wheel brake cylinders 142 being then only that which is transmitted from the brake pedal 110, which is considerably less than the pressure available when motor 131 of unit 130 is in operation.

Referring to Figures 3, 7 and 8, nipple 13 of the suction valve chamber 11 is connected by flexible hose or conduit 146 to the neck of T 143 and nipple 14 of the air inlet valve chamber 12 is connected by a flexible hose or conduit 147 to nipple 100 of the suction operated primary motor. Normally the suction and air inlet valves 24 and 45, respectively, are in their positions shown in full lines in Figure 3, with valve 24 closed and valve 45 open. So disposing valves 24 and 45 disables motor 77 and renders it ineffective for braking, by closing it to the source of suction. When it is desired to brake the automobile, the operating member 123 may be grasped by the fingers, while grasping the steering wheel 115, and moved upward thereby moving the control valve means operating lever 57 in braking direction in the upward movement of arm 60 of that lever. During the first part of the upward movement of arm 60 air inlet valve 45 is moved to closed position after which the suction valve 24 is moved to open position, due to the lost motion connection previously referred to. In the continued upward movement of arm 60 suction valve 24 is opened to an increasing extent and compression spring 44 is placed under compression thereby assuring that the air inlet valve 45 remains seated. Closing of the air inlet valve 45 and opening of the suction valve 24 enables the motor 77 and renders it effective for braking, by establishing communication between the source of suction or manifold 136 and the interior of the casing of the primary motor 77 through the cross connection tube 54, chamber 12, nipple 14 and conduit 147 and nipple 100. That creates a suction or partial vacuum within motor 77 and diaphragm 84 is forced by atmospheric pressure toward wall 99 thereby moving plunger 94 inwardly and swinging the brake applying lever 102 downward so as to exert corresponding downward pressure on the brake pedal 110, which pressure is transmitted to the power unit 130 as above described. When the suction in the primary motor reaches a value sufficient to overcome the resiliency of the lower arm 34 of leaf spring 35, suction valve 24 is moved to closed position by atmospheric pressure on the upper face of diaphragm 17 and remains closed so long as the operating lever 57 remains stationary. With the operating lever 57 stationary in braking position and the suction valve 24 closed, the pressure exerted by lever 102 on the brake pedal 110 remains constant and the brakes remain applied under predetermined constant pressure. If arm 60 of lever 57 is raised a further distance the suction valve 24 is again opened and increasing suction is applied to the primary motor with resulting increase in pressure on the brake pedal 110 and corresponding increased braking pressure in the wheel brake cylinders 142. In case of emergency the arm 60 of control lever 57 may be moved quickly upward to its full extent thus rendering available the full power of the system for braking purposes. In extreme cases, the rapid upward movement of arm 60 to its full extent may be supplemented by foot pressure upon the brake pedal 110 thus providing braking pressure supplemental to that of the system for an abrupt or crash stop of the automobile. Except under unusual conditions the power available from the brake means of my invention is adequate and there is no necessity for the driver changing his foot from the accelerator pedal to the brake pedal. Accordingly the brakes may be applied with a minimum of delay and to any extent desired. Hand control of the brake system is desirable in driving in heavy traffic in that braking to any desired extent may be effected without delay and the engine power is available for maneuvering purposes. It is also desirable when travelling upon icy or slippery surfaces that the engine power remain available for maneuvering out of a skid. The brake pedal 110 is not secured to the brake applying lever 102 and may be used independently thereof, if desired, or in conjunction with the primary motor for applying the maximum possible braking pressure in emergency, as above explained.

The modified form of control valve means 145 shown in Figures 9 to 11, inclusive, comprises a casing formed in two substantially cylindrical sections 146 and 147 having outwardly extending circumferential base flanges 148 and 149, respectively, bolted together and clamping between them the outer marginal portion of a flexible diaphragm 150 of suitable material. Casing section 147 is provided at its upper end with a neck 151 which slidably receives a plunger 152 having a circumferential groove receiving an O sealing ring 153 providing an air tight seal about plunger 152. A cup 154, secured to the inner end of plunger 152, receives the upper end of a compression spring 155 the lower end of which seats on an outer circumferential flange 156 of a tubular vacuum control valve 157 disposed within spring 155 and also seating at its upper end in cup 154. The inner marginal portion of diaphragm 150 is clamped between flange 156 and a clamp ring 158 disposed at about the midlength of valve 157 and secured thereto in a suitable manner, as by having a drive fit thereon. The lower portion of valve 157 is slidable through a guide 159 secured in the lower portion of casing section 146 in a suitable manner, as by having a drive fit therein. A compression spring 160, considerably lighter than spring 155, is disposed about valve 157 and confined between guide 159 and a seat member 161 seating on ring 158. Casing section 146 is provided at its lower end with an air inlet port 162 concentric with, and of materially greater diameter than, valve 157, and a valve seat element 163. The lower end of valve 157 is accurately formed to provide a seat for an air intake disc valve 164, formed of rubber or any suitable material, operable in an open valve cage 165 suitably secured, conveniently by welding, to the bottom of casing section 146. A compression spring 166, confined between the bottom of valve cage 165 and disc valve 164, yieldingly urges the latter toward valve 157 normally holding it seated thereon. When the vacuum control valve 157 is in its normal brake releasing position, shown in full lines in Figure 9, disc valve 164 is spaced from its seat element 163 admitting air, through port 162 and openings 159a in guide 159, to the casing section 146.

The vacuum control valve 157 is provided with an opening 167 to the interior of casing section 147, which has a nipple 13a opening thereinto, and casing section 146 has a nipple 14a opening into it. Referring to Figure 11, the nipple 13a is connected, by conduit 146, fitting 143 and conduit 134, to a suitable source of suction such as the intake manifold 136 of the automobile engine, and the nipple 14a is connected, by conduit 147 to nipple 100 of the suction operated or vacuum motor 77. A valve control and operating lever 168 is pivoted at one end, at 169, in a bracket 170 secured to the upper end of casing section 147. Lever 168 extends diametrically of casing section 147 and seats at its lower edge on the upper end of plunger 152. A tension spring 171 disposed at the opposite side of casing section 147 from bracket 170, is anchored at its upper end to lever 168 and at its lower end to flange 149 of casing section 147. Tension spring 171 normally holds the vacuum control valve 157 in its fully lowered position shown in Figure 9. The lower end of valve 157 is then closed by disc valve 164, closing the vacuum operated motor 77 to suction and opening it to atmosphere through port 162, disc valve 164 being then spaced from its seat element 163. The motor 77 is then disabled and rendered ineffective for braking so that the brakes remain released as long as the vacuum control valve 157 remains in its fully lowered position.

The control valve means operating and control lever 168 may be actuated by either the hand operated control means previously described, or in any suitable manner. As the lever 168 is moved upward the vacuum control valve 157 also moves upward and with it the disc valve 164, until the latter seats upon the seat element 163 closing port 162. In that connection, it may be noted that when disc valve 164 is seated on the lower end of valve 157 there is a partial vacuum in casing section 147 and in the valve 157, disc valve 164 being then held seated on valve 157 by such partial vacuum augmented by the compression spring 166. The tension spring 171 is of sufficient strength normally to hold the vacuum control valve 157 in its fully lowered position in opposition to the compression springs 160 and 166 and the partial vacuum prevailing in casing section 147 and valve 157, as will be understood from what has been said. After the disc valve 164 seats on its seat element 163, in the continued upward movement of lever 168 and valve 157 the latter moves away from disc valve 164. When that occurs nipple 14a is connected to the suction source, through the then open lower end of the vacuum control valve 157, thus enabling the motor 77 and rendering it effective for braking as previously described. If it is desired to obtain the maximum braking effect, as in an emergency, the lever 168 may be quickly raised to sufficient extent to permit valve 157 to move quickly to its fully raised position, indicated in broken lines in Figure 9. The power motor 77 then has unrestricted communication with the suction source and the brakes are quickly applied under maximum pressure, as has been described above. When the brakes have been applied at the desired pressure, either maximum or any desired intermediate pressure, the lever 168 may be released sufficiently to return the valve 157 to its holding position shown in Figure 10, seating on disc valve 164, with the latter remaining in its closed position. The suction source is then closed off from the motor 77 and the brakes remain set under the pressure determined by the extent of movement of valve 157 in braking direction. When driving at moderate or low speeds it is seldom necessary to use maximum braking pressure. Slight movement of lever 168, providing a restricted opening or crack between valve 157 and disc valve 164, may suffice in many cases, and if increased braking is desirable it can be effected by gradually moving valve 157 a further distance away from disc valve 164. In that manner the driver can obtain a gradually increasing braking effect, often desirable when driving at low or moderate speeds, or in traffic. In view of the fact that the vacuum control valve 157 is seated on the disc valve 164, when in holding position, the disc valve 164 may be opened readily by appropriate movement of valve 157. That renders it possible to admit air in regulated amount to motor 77 so as to reduce the effective partial vacuum therein, thereby regulating the effective braking pressure as desired. In that manner, if the brakes are applied at a pressure greater than circumstances require, the brake pressure may be reduced without releasing the brakes, by bleeding air into the motor 77, or, if desired, the brakes may gradually be released. The valve control means of Figures 9 and 10 provide quite sensitive control of the brakes and, under certain conditions, is preferable to that of Figures 1 to 3, inclusive. In the above description I have referred to the control valve means of Figures 9 and 10 as being disposed in vertical position with the plunger 152 uppermost, for purposes of description. It may, however, be disposed in any suitable position and operated in any suitable manner, within the broader aspects of my invention, as will be understood from what has been said.

It will be understood that changes in detail may be resorted to without departing from the field and scope of my invention, and I intend to include all such variations, as fall within the scope of the appended claims, in this application in which the preferred forms only of my invention have been disclosed.

I claim:

1. In automobile brake means, a source of suction, wheel brake cylinders, a booster comprising a suction operated motor connected to said source of suction and a pressure cylinder connected to said wheel brake cylinders for transmitting pressure thereto, a master cylinder connected to said pressure cylinder for transmitting pressure thereto, a brake pedal having operating connection to said master cylinder, a suction operated primary motor supplementary to said booster having a casing permanently open to atmosphere at one end and a movable wall in said casing yieldingly urged toward said one end thereof, a pedal operating lever connected to said movable wall and disposed in cooperating relation to said pedal effective for moving said pedal in braking direction when said wall is moved toward the other end of said casing, control valve means having a normal brake release position opening to atmosphere the space in said casing between said wall and said other end of said casing and closing said space to suction thereby disabling said primary motor and placing braking under control of said brake pedal, said control valve means being movable from said normal position in braking direction effective for closing said space to atmosphere and connecting it to said source of suction to variable extent thereby enabling said primary motor and placing braking under control of said brake pedal and said primary motor selectively, a control valve operating lever connected to said control valve means for moving the latter in braking direction, and an operating member connected to said valve lever for adjusting it independently of said brake pedal.

2. In automobile brake means, a source of suction, wheel brake cylinders, a booster comprising a suction operated motor connected to said source of suction and a pressure cylinder connected to said wheel brake cylinders for transmitting pressure thereto, a master cylinder connected to said pressure cylinder for transmitting pressure thereto, a brake pedal having operating connection to said master cylinder, a suction operated primary motor supplementary to said booster having a casing permanently open to atmosphere at one end and a wall therein movable toward said one end thereof when said primary motor is disabled and movable toward the other end of said casing when said primary motor is enabled, a plunger secured to said movable wall projecting beyond said one end of said casing, a lever disposed in cooperating relation to said pedal and attached to said plunger movable thereby and effective for moving said pedal in brake applying direction when said wall is moved toward said other end of said casing, said pedal being free of said lever for independent movement in braking direction whereby braking is under control of said brake pedal when said primary motor is disabled, and control valve means for optionally disabling and enabling said primary motor comprising means for opening to atmosphere and closing to said suction source the space within said casing between said other end thereof and said wall thereby placing braking under control of said brake pedal and for closing said space to atmosphere and opening it to suction to variable extent thereby placing braking under control of said brake pedal and said primary motor selectively.

3. In automoile brake means, a source of suction, wheel brake cylinders, a booster comprising a suction operated motor connected to said source of suction and a pressure cylinder connected to said wheel brake cylinders for transmitting pressure thereto, a master cylinder connected to said pressure cylinder for transmitting pressure thereto, a brake pedal having operating connection to said master cylinder, a suction operated primary motor supplementary to said booster having a casing permanently open to atmosphere at one end and a wall therein movable toward said one end thereof when said primary motor is disabled and movable toward the other end of said casing when said primary motor is enabled, a plunger secured to said movable wall projecting beyond said one end of said casing, a lever disposed in cooperating relation to said pedal and attached to said plunger movable thereby and effective for moving said pedal in brake applying direction when said wall is moved toward said other end of said casing, said pedal being free of said lever for independent movement in braking direction whereby braking is under control of said brake pedal when said primary motor is disabled, control valve means adjustable for optionally disabling and enabling said primary motor comprising means for opening to atmosphere and closing to said suction source the space within said casing between said other end thereof and said wall thereby placing braking under control of said brake pedal and for closing said space to atmosphere and opening it to suction to variable extent thereby placing braking under control of said brake pedal and said primary motor selectively, and supplementary means comprising a movable wall exposed to atmospheric pressure urged thereby in one direction and having yielding connection to said control valve means accommodating adjustment thereof and effective for closing said space to both atmosphere and suction for any adjustment of said valve means in braking direction and thereby maintaining braking under constant pressure corresponding to such adjustment of said valve means.

4. The automobile brake means of claim 1 with said control valve means comprising a casing and a valve operating wall therein movable toward and away from one end thereof, said casing being connected to said source of suction at one side of said wall therein and to said motor at the other side of said wall and having an air inlet port at said other side of said valve operating wall, valve means operated by said valve operating wall for closing said port and establishing communication between the spaces in said valve casing at opposite sides of said wall therein responsive to movement of said valve operating wall toward said one end of said valve casing and for opening said port and cutting off communication between said spaces responsive to movement of said valve operating wall away from said one end of said valve casing, and means for effecting movement of said valve operating wall toward and away from said one end of said valve casing.

5. The automobile brake means of claim 1 with said control means comprising a casing and a movable valve operating wall therein providing an air inlet chamber having an air inlet port and a suction chamber, said air inlet chamber being connected to said motor and said suction chamber being connected to said source of suction, valve means actuated by said valve operating wall effective for closing said port and establishing communication between said chambers responsive to movement of said valve operating wall toward said suction chamber and opening said port and closing communication between said chambers responsive to movement of said operating wall toward said air inlet chamber, and means for effecting movement of said valve operating wall toward said chambers respectively.

6. In automobile brake means, a power brake system comprising a source of suction, a booster, and a master cylinder and a brake pedal for operating said system, a suction operated primary motor having a casing open at one end to atmosphere and a movable wall in said casing yieldingly urged toward said one end thereof, a pedal operating lever overlying said pedal and attached to said movable wall effective for pressing said pedal in braking direction when said wall is moved toward the other end of said casing, control valve means having two valve chambers and control valves therein, one of said chambers being closed at one end by a movable wall attached to the corresponding valve for moving it in opening direction and being connected to said source of suction between its other end and said valve, the other of said chambers having at one end an opening to atmosphere controlled by the corresponding valve and being connected at its other end to the space in said motor casing between the other end thereof and said movable wall of said motor, a cross connection opening into said chambers between said valves, a control valve operating lever yieldingly urged in one direction to brake releasing position, and yielding and lost motion connections between said valve lever and valves effective for first closing the valve of said one chamber and then opening the valve of said other chamber in the movement of said valve lever to brake releasing position and for opening and closing said valves in the reverse order in the movement of said valve lever in the opposite direction.

7. In automobile brake means, a power brake system comprising a source of suction and a master cylinder and a brake pedal for operating said system, a suction operated primary motor having a casing open at one end to atmosphere and a movable wall in said casing yieldingly urged toward said one end thereof, a pedal operating lever overlying said pedal and attached to said movable wall effective for pressing said pedal in braking direction when said wall is moved toward the other end of said casing, a suction valve chamber closed at its upper end by a flexible diaphragm, a normally closed suction valve controlling said chamber having a stem attached to said diaphragm for moving said valve in closing direction, an air admission valve chamber having an air admission opening at its upper end, an air valve controlling said opening, a cross connection opening into said chambers between said valves, means connecting said suction source to said suction valve chamber below said valve therein, means connecting said air admission valve chamber to the space in said motor casing between said movable wall and the other end thereof, a valve operating lever yieldingly urged in one direction to brake releasing position, and yielding and lost motion connections between said valve operating lever and valves effective for first closing said suction valve and then opening said air valve in the movement of said valve operating lever in said one direction and for opening and closing said valves in the reverse order in the braking movement of said valve operating lever in the opposite direction, said connections accommodating closing of said suction valve by said diaphragm when said valve operating lever is moved in said opposite direction.

8. In automobile brake means, a power brake system comprising a source of suction and a master cylinder and a brake pedal for operating said system, a steering column adjacent said pedal and a steering wheel at the upper end of said column, an operating member mounted on said column for vertical movement and underlying said wheel in proximity thereto and substantially concentric therewith, a suction operated primary motor having a casing open at one end to atmosphere and a movable wall in said casing yieldingly urged toward said one end thereof, a pedal operating lever overlying said pedal and attached to said movable wall effective for pressing said pedal in braking direction when said wall is moved toward the other end of said casing, a suction valve chamber closed at its upper end by a flexible diaphragm, a normally closed suction valve controlling said chamber having a stem attached to said diaphragm for moving said valve in closing direction, an air admission valve chamber having an air admission opening at its upper end, an air valve controlling said opening, a cross connection opening into said chambers between said valves, means connecting said suction source to said suction valve chamber below said valve therein, means connecting said air admission valve chamber to the space in said motor casing between said movable wall and the other end thereof, a valve operating lever yieldingly urged in one direction to brake releasing position, yielding and lost motion connections between said valve operating lever and valves effective for first closing said suction valve and then opening said air valve in the movement of said valve operating lever in said one direction and for opening and closing said valves in the reverse order in the braking movement of said valve operating lever in the opposite direction, said connections accommodating closing of said suction valve by said diaphragm when said valve operating lever is moved in said opposite direction, and connections between said operating member and said valve operating lever for moving the latter in said opposite direction in the upward movement of said operating member.

References Cited in the file of this patent

UNITED STATES PATENTS

| | | |
|---|---|---|
| 1,760,624 | Badertscher | May 27, 1930 |
| 2,381,989 | Stelzer | Aug. 14, 1945 |
| 2,471,244 | Self | May 24, 1949 |
| 2,562,704 | Dubreuil | July 31, 1951 |

UNITED STATES PATENT OFFICE

CERTIFICATE OF CORRECTION

Patent No. 2,931,465 April 5, 1960

Edward L. Mayo

It is hereby certified that error appears in the above numbered patent requiring correction and that the said Letters Patent should read as corrected below.

In the grant, lines 1, 2 and 3, for "Edward L. Mayo, of Cleveland, Ohio," read -- Edward L. Mayo, of Cleveland, Ohio, assignor to The Bishop and Babcock Manufacturing Company, of Cleveland, Ohio, a corporation of Ohio, --; line 12, for "Edward L. Mayo, his heirs" read -- The Bishop and Babcock Manufacturing Company, its successors --; in the heading to the printed specification, line 3, for "Edward L. Mayo, Cleveland, Ohio" read -- Edward L. Mayo, Cleveland, Ohio, assignor to The Bishop and Babcock Manufacturing Company, Cleveland, Ohio, a corporation of Ohio --.

Signed and sealed this 6th day of September 1960.

(SEAL)
Attest:
ERNEST W. SWIDER
Attesting Officer

ROBERT C. WATSON
Commissioner of Patents